June 27, 1972  A. J. BARBERA  3,672,999
USE OF UNILLUMINATED SOLAR CELLS AS SHUNT
DIODES FOR A SOLAR ARRAY
Filed Dec. 19, 1968
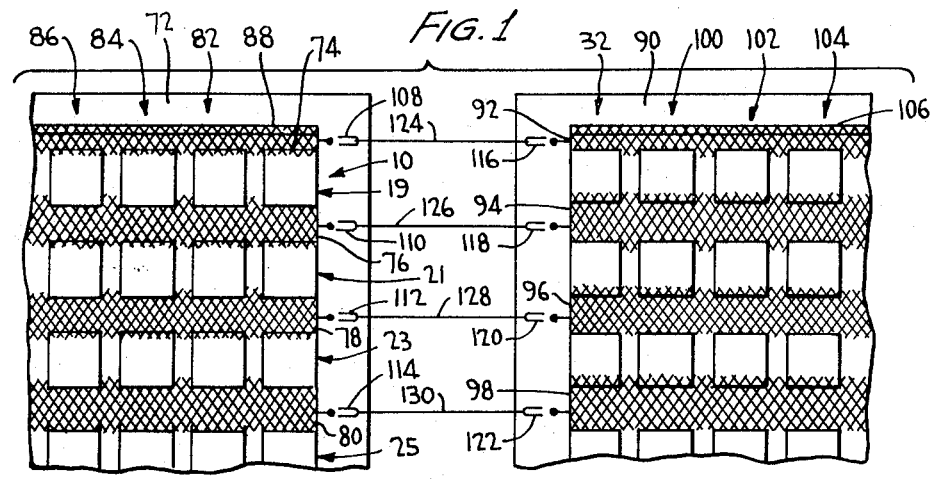
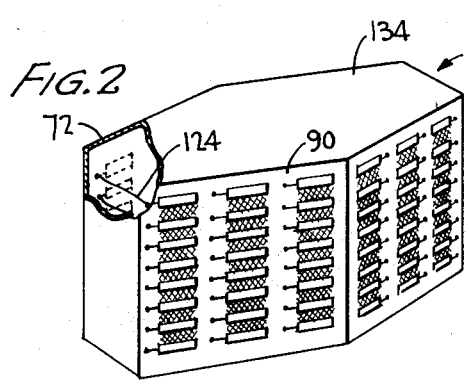
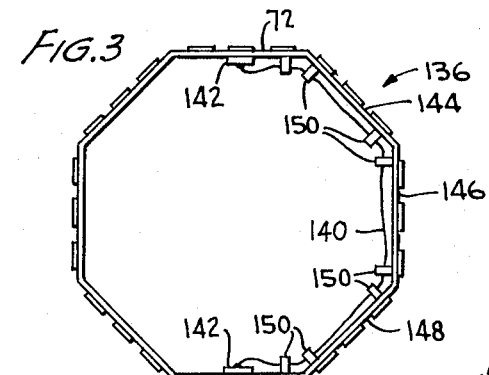
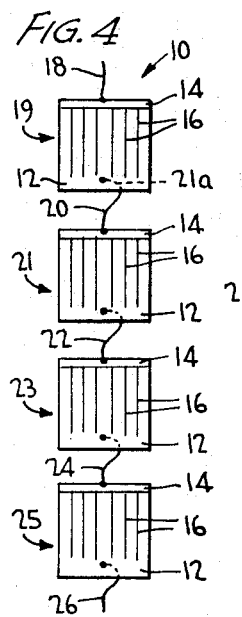
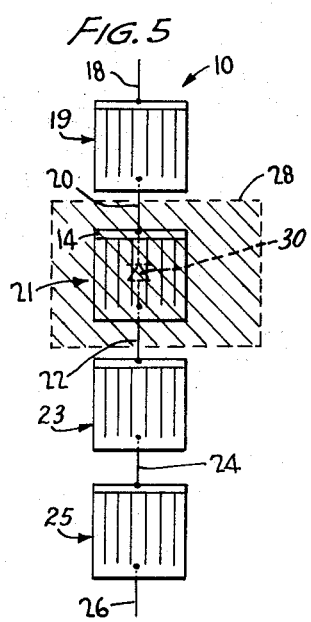
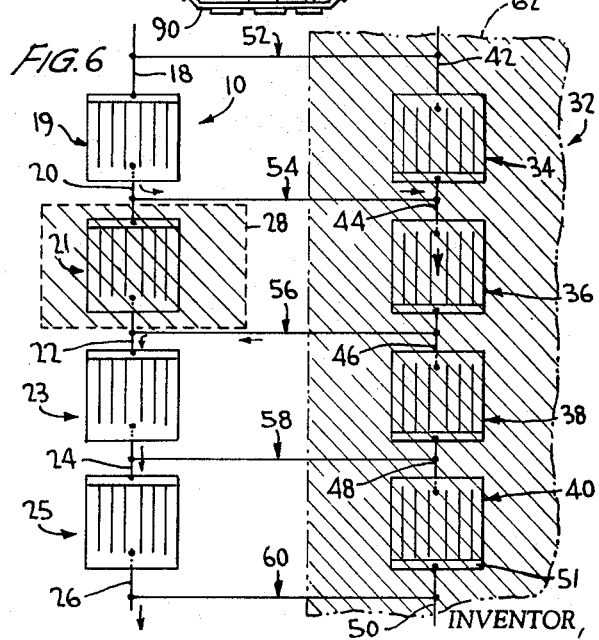
INVENTOR,
ANTHONY J. BARBERA
BY *Carl Levy*
ATTORNEYS United States Patent Office 3,672,999
Patented June 27, 1972

3,672,999
USE OF UNILLUMINATED SOLAR CELLS AS
SHUNT DIODES FOR A SOLAR ARRAY
Anthony J. Barbera, Greenbelt, Md., assignor to the
United States of America as represented by the Administrator of the National Aeronautics and Space Administration
Filed Dec. 19, 1968, Ser. No. 785,078
Int. Cl. H01l 15/02
U.S. Cl. 136—89                              9 Claims

ABSTRACT OF THE DISCLOSURE

In a plurality of solar cells connected in a number of series paths to form both shaded and illuminated solar batteries, each individual cell of a shaded battery being electrically connected in parallel but in opposite polarity with a corresponding cell of an illuminated solar battery, the p-n junction solar cell of the shaded battery behaving as a forward biased diode forming a by-pass conducting path around the corresponding illuminated cell should it become non-conductive to thereby achieve an uninterrupted generation of electrical current by the remaining illuminated cells of the solar battery containing the non-conducting cell.

---

The invention described herein was made by an employee of the United States Government and may be manufactured or used by or for the United States Government for governmental purposes without the payment of any royalties thereon or therefor.

The present invention relates to an improvement in electrical interconnection of solar cells in an array of solar batteries, and, more specifically, to the electrical interconnection in parallel but in opposite polarity of an illuminated cell of a solar battery with a corresponding solar cell of an unilluminated (shaded) battery in the solar cell array.

In many space craft applications, as well as in other applications, power is generated by a p-n junction solar cell battery. Each individual cell of such a battery has a N doped material on a top exposed surface which is provided with the well known grid lines and an electrical contact terminal. On the unexposed bottom surface of the cell is located a P doped material. Incident light on the exposed surface of the cell creates a voltage such that the exposed surface becomes negative in potential and the undersurface becomes positive in potential.

With a plurality of such cells being connected in series to form the solar battery and the top surface of each cell being connected to the bottom surface of an adjacent cell, a flow of current will be produced flowing in a direction from positive to negative, i.e. from the bottom surface of one cell into the top surface of an adjacent cell. If one of the series connected cells of the solar battery becomes disabled, either because of a malfunction or because it becomes temporarily in a shadow (being unilluminated), the flow of current therethrough is interrupted. More specifically, a disabled cell becomes the equivalent of a reversed biased p-n junction connected in series with the remaining solar cells of the solar battery, thereby preventing current flow through the series connected cells.

Heretofore, it has been proposed to alleviate the problem created by a disabled solar cell by connecting in parallel therewith a diode of opposed forward conducting characteristics. In practice, the diode would provide a forward biased p-n junction thereby cancelling the effect of the reversed biased p-n junction that would come into play should the cell become disabled. However, because of the use of additional circuit components, there was an increase in cost and a decrease in reliability. Accordingly, the present invention was devised as a solution to the disadvantages presented by the prior art proposal.

The present invention makes use of the well known practice of providing a plurality of solar batteries in a space craft or other application wherein some of the batteries are illuminated whereas others are shadowed from illumination. For example, the solar batteries on the sun oriented surface of a space craft are illuminated and the remaining solar batteries on the darkness oriented surface of the space craft are not illuminated (being shadowed). According to the invention, each of the cells on a darkened or shadowed solar battery are interconnected in parallel and in reverse polarity with a corresponding cell of a solar battery on the illuminated surface of the space craft. By this configuration, each such interconnected unilluminated solar cell behaves as a p-n junction diode in parallel but in opposite polarity with a corresponding illuminated cell of the illuminated solar battery. Should a cell of the illuminated battery become disabled, the corresponding cell on the unilluminated surface behaves as a forward biased p-n junction diode to provide a by-pass current path around the disabled cell, enabling the solar battery, of which the disabled cell is part, to continue generation of current. The other cells of the solar battery on the unilluminated surface do not behave as forward biased p-n junction diodes but rather behave as reverse biased p-n junction diodes and are non-conductive since the corresponding non-disabled cells of the illuminated solar battery generate voltages. When the space craft revolves 180°, the cells that heretofore were illuminated become shadowed and thereby act as shunting diodes for the now illuminated cells which were previously on the darkness oriented surface of the space craft. Thus, the invention obviates the need for a separately provided diode in association with each solar cell.

It is therefore an object of the invention to provide a solar cell battery with continuous voltage generating capabilities.

A further object of the invention is to provide a solar cell battery with continuous voltage generating capabilities despite disablement of an individual cell of the battery.

Still a further object of the invention is to provide a conditionally activated by-pass current path around each individual cell of a solar cell battery.

Still another object of the invention is to provide a solar cell array with electrical interconnections whereby each individual cell of an illuminated solar battery in the array is electrically interconnected in parallel and in reverse polarity with a corresponding cell of an unilluminated solar battery in the array.

Other objects and many attendant advantages of the present invention will become obvious to one having ordinary skill in the art upon a further perusal of the hereinafter detailed description of the present invention, taken in conjunction with the accompanying drawing wherein:

FIG. 1 is a partial elevation of two terminal boards, each comprising a solar cell panel and mounting a plurality of solar batteries, the individual cells of all the batteries of one terminal board being interconnected in parallel but in opposite polarity with corresponding individual cells of the solar batteries on the other terminal board;

FIG 2 is a perspective of a solar paddle provided with a plurality of solar cell panels mounted on the outer side-wall surfaces of the solar paddle and partially broken away to illustrate a specific interconnection between solar cells mounted on different panels;

FIG. 3 is a plan view of a spacecraft with its top cover removed to particularly illustrate a different embodiment of the interconnection between solar cells of different solar cell panels;

FIG. 4 is a schematic representation of a plurality of series connected solar cells forming a solar cell battery;

FIG. 5 is a schematic representation of the solar cell battery illustrated in FIG. 4 depicting, by dashed lines, a p-n junction diode that would generally be representative of one individual disabled or unilluminated cell of the battery; and FIG. 6 is a schematic representation of the solar cell battery illustrated in FIG. 5 together with a second similar solar cell battery, the individual cells of which are connected in parallel but in opposite polarity with a corresponding cell of the former battery.

With more detailed reference to the drawing, there is shown in FIG. 4, a plurality of solar cells, generally shown at 10, connected in series to form a solar battery. Each cell is provided with N doped material on its top exposed surface 12, which surface is provided with the well known electrical contact 14 and the well known grid lines 16. Each cell is provided with a terminal connected to the contact 14. For example, the topmost illustrated cell is provided with a terminal 18 connected to its corresponding contact 14. As is well understood in the prior art, each cell's undersurface (not shown) is provided with P doped material and provided with a terminal attached thereto. More specifically, the topmost illustrated cell is provided with a negative terminal 20 passing under the undersurface of the cell and being attached thereto, as illustrated in phantom at 21a. Obviously, the terminal 20 also forms the series interconnection between the topmost illustrated cell and the cell immediately adjacent thereto. Accordingly, the terminal 20 is shown connected to the contact 14 of such adjacent cell. In a similar fashion, the remaining cells are respectively provided with terminals 22 and 24 interconnecting adjacent cells. Similarly, the lowermost illustrated cell is provided with a terminal 26. The series interconnected cells then provide a solar cell battery, which, when illuminated, provide continuous voltage generation with a corresponding current flow from the terminal 18, through the top surface of each cell, through the undersurfaces thereof and through the interconnecting terminals 20, 22 and 24, the current flow emerging from the battery at terminal 26.

With more particular reference to FIG. 5, the circuit of the battery illustrated in FIG. 4 is shown with an individual cell of the battery 10 being shadowed. For example, the cell 21 of the battery 10 is shown in a shadow defined at 28 in phantom lines. Under the influence of such a shadow 28, the cell 21 is temporarily disabled and is no longer able to generate a voltage or conduct the current generated by the illuminated cells therethrough. More specifically, the interconnecting terminal 20 attached to the contact 14 of the cell 21 is of positive potential, governed by the polarity of the P-doped undersurface of the conductive, illuminated cell 19, whereas the terminal 22 connected to the undersurface of the cell 21 is of negative potential governed by the polarity of the N-doped exposed surface of the conductive, illuminated cell 23. Since the cell 21 is of p-n junction configuration, its representative circuit is generally that of a diode, schematically illustrated at 30 by dashed lines. While not shown, all the solar cells depicted in the figures could be so represented. By virtue of its connection between the terminals 20 and 22 of the polarity just described, the representative diode is reverse biased, thereby preventing the flow of current through the cell and disabling the entire battery 10 of which the cell 21 is a part.

With more specific reference now to FIG. 6 of the drawing, the merits of the present invention will become clear. According to the invention, the solar cell battery 10 is shown more particularly in FIG. 6 with each of its individual cells interconnected in parallel but in opposite polarity with a corresponding cell of a similarly configured solar cell battery. More specifically, there is shown in FIG. 6, the solar cell battery 10 in electrical association with a similar solar cell battery shown generally at 32. The battery 32 is provided with a plurality of series connected cells 34, 36, 38 and 40. The cell 34 is provided with a terminal 42 attached to the undersurface, not shown, of the cell. A plurality of terminals 44, 46 and 48 respectively connect the cells 34, 36, 38 and 40 of the solar cell battery 32 in series relationship. The cell 40 of the solar battery 32 is provided with a terminal 50. It should be understood that each of the terminals 42, 44, 46, 48 and 50 are connected to the individual cells of the solar cell battery 32 in a fashion similar to the manner in which the terminals 18, 20, 22, 24 and 26 are connected to the individual cells of the solar battery 10.

By way of specific reference to FIG. 6, and in accordance with the principles embodied in the present invention, the cell 19 of the solar battery 10 is interconnected in opposite polarity in parallel relationship with the cell 34 of the solar battery 32 by a pair of electrical conductors 52 and 54. As shown, the conductor 52 is connected at one end to the terminal 18 of the cell 19, and at its other end to the terminal 42 of the cell 34. Similarly, the conductor 54 is connected at one end to the terminal 20 of the cell 19, and at its other end to the terminal 44 of the cell 34. In similar fashion, each of the remaining cells 21, 23 and 25 of the battery 10 are respectively connected in parallel relationship but in opposite polarity with the cells 36, 38 and 40 of the battery 32. More specifically the cell 21 of the battery 10 is connected by way of the conductor 54 and a conductor 56 in parallel relationship but in opposite polarity with the cell 36 of the battery 32, the conductor 56 being attached at one end to the terminal 22 and at its other end to the terminal 46. The cell 23 of the battery 10 is connected by way of the conductor 56 and a conductor 58 in parallel relationship but in opposite polarity with the cell 38 of the battery 32, the conductor 58 being attached at one end to the terminal 24 and its other end to the terminal 48. The cell 25 of the battery 10 is connected by way of the conductor 58 and a conductor 60 in parallel relationship but in opposite polarity with the cell 40 of the battery 32, the conductor 60 being connected at one end to the terminal 26 and at its other end to the terminal 50.

It should be noted, when battery 32 is illuminated, in accordance with the principles embodied in the invention, the corresponding current produced by the battery 32 is caused to flow from the terminal 50, sequentially through each of the cells 40, 38, 36 and 34 and emerges at the terminal 42. Additionally it should be observed that the flow of current in the battery 32 when it is illuminated is in a direction opposite to the current flow produced by the battery 10 when it is illuminated and that each cell of the battery 32 is connected in reverse polarity with a corresponding cell of the battery 10.

To explain further the operation of the batteries when interconnected in the fashion as described above, the battery 32 will be presumed to be in a shadow, indicated generally by the area defined by the phantom lines 62, and the solar battery 10 is presumed to be illuminated. Accordingly, so long as the cells of the battery 10 remain illuminated, a continuous generation of voltage will occur with a corresponding current flow created in the direction generally vertically downward as heretofore described. As is well known in the art, the shadowed battery 32 does not generate current since it is not illuminated. Accordingly, each of the cells thereof, interconnected as described, behaves as a p-n junction diode in parallel with a corresponding illuminated cell of the battery 10. Current will not flow through the unilluminated battery 32 since each illuminated cell in battery 10 generates a voltage of such a polarity as to reverse bias the representative diode of the shadowed solar cell connected in parallel but in opposite polarity with it in the unilluminated battery 32.

As heretofore described in conjunction with FIG. 5, and as shown again in FIG. 6, an individual cell, for example, the cell 21 may become inoperative or disabled in any number of ways. One way, for example, is that it may become impressed with a shadow indicated generally at 28. The cell 21 therefore behaves as a p-n junction diode which is reversed biased by the remainder of the illuminated battery 10. This representative diode behavior thereby causes shut-down of the solar battery 10 as previously described.

However, according to the invention, the shadowed cell 21 is connected in parallel but in opposite polarity with a corresponding unilluminated cell 36 of the battery 32. The representative diode of the cell 36, being forward biased cancels the deleterious prohibition of current flow provided by the reversed biased diode behavior of shadowed cell 21; the only penalty that results is a 0.6 voltage drop required to render the representative diode of shadowed cell 36 conducting, summed with a 0.5 volt loss in the output of cell 21, making a total of 1.1 voltage drop. Thus, the cell 36 of the unilluminated battery 32, connected in parallel with the disabled cell 21, provides a by-pass or shunt path for the flow of current generated by the remaining illuminated cells 19, 23 and 25 of the battery 10. Since the potential difference between terminals 20 and 22, and hence between terminals 44 and 46, respectively, is in the correct polarity and is more than sufficient to render the representative diode of cell 36 conducting.

FIG. 1 of the drawings particularly illustrates a practical application of the solar cell battery configuration as shown schematically in FIG. 6. With further reference to FIG. 1, there is shown a terminal board 72 mounting the solar battery 10, the individual cells 19, 21, 23 and 25 of which are connected in series by mesh terminals 74, 76, 78 and 80 which correspond to the terminals 18, 20, 22 and 24 of the schematically illustrated battery of FIGS. 4 and 6. The particular mesh terminals will not be described in detail, it being understood that such terminals are of the type commonly employed for connecting solar cells and for mounting them to a terminal board or solar cell panel. As shown in the figure, each of the mesh terminals are of extended length to incorporate additional solar cell batteries, for example, the batteries indicated generally at 82, 84 and 86, which additional batteries are comprised of a plurality of solar cells corresponding to the cells 19, 21, 23 and 25 of the battery 10. In the configuration shown, the batteries 10, 82, 84 and 86 are connected in parallel and in like polarity by the mesh terminals, each battery producing a current flow in a vertically downward direction in the similar manner as heretofore described in the specific description of the battery 10. As shown in the figure, the batteries provide a solar cell array, the common terminal 74 thereof being secured in a well known manner to a well known, common conductor bar 88 which is attached by any suitable means to the terminal board or solar cell panel 72.

Similarly, a second terminal board or solar cell panel 90 mounts a solar cell battery corresponding to the schematically illustrated battery 32 of FIG. 6. Again, the schematically illustrated battery terminals 42, 44, 46 and 48 are shown as corresponding to the wire mesh terminals 92, 94, 96 and 98. Similar in construction to the terminals described in conjunction with the terminal board 72, the terminals 92, 94, 96 and 98 are of extended length to interconnect a plurality of additional batteries 100, 102 and 104 in parallel and in like polarity relationship with the battery 32. The common terminal 92 of the batteries associated with the solar cell panel 90 is connected in a well known manner to an elongated conductor bar 106 similar to the conductor bar 88 and mounted to the surface of the solar cell panel 90. It should be understood that all the illustrated batteries are provided at their lowermost ends (not shown) with another common terminal, not shown for purposes of clarity, secured in a similar fashion to the terminal boards 72 and 90, respectively.

Yet, with reference to FIG. 1, the terminal 74 associated with the batteries 10, 82, 84 and 86 is provided with a terminal connection 108 extending completely through the terminal board 72. Similarly, the terminal 76 is provided with a terminal connection 110, the terminal 78 is provided with a terminal connection 112, and the terminal 80 is provided with a terminal connection 114. The batteries mounted on the solar cell panel 90 are provided with similar terminal connections. More specifically, the terminal 92 is provided with a terminal connection 116, the terminal 94 is provided with a terminal connection 118, the terminal 96 is provided with the terminal connection 120 and the terminal 98 is provided with a terminal connection 122. To interconnect the batteries on terminal board 72 in parallel with those on terminal board 90, in accordance with the invention embodiment as described in FIG. 6, a cable connector or another suitable conductor 124 is connected in the well known manner to the terminal connections 108 and 116. A conductor 126 connects the terminal connections 110 and 118, a conductor 128 connects the terminal connections 112 and 120 and a conductor 130 connects the terminal connections 114 and 122. Thus, each of the series connected cells on the solar cell panel 72 are interconnected in parallel but in opposite polarity with a corresponding cell of the solar cell panel 90. By comparing the orientation of the cells on both the solar cell panels 72 and 90 with the solar cells particularly illustrated in the schematic illustrations of the batteries 10 and 32 of FIG. 6, the thus interconnected cells will operate according to the concepts particularly discussed in the desecription of FIG. 6 of the drawing.

In actual practice, the solar cell panels 72 and 90 may be erected to form opposed sidewalls of a spacecraft or solar paddle, or alternatively, be mounted to existing sidewalls of a spacecraft or solar paddle. With more particular reference to FIG. 2, an exemplary solar paddle is indicated generally at 132, having a top cover 134. The solar cell panel 72 is mounted to an illuminated sidewall of the solar paddle, as illustrated in the figure, whereas the solar cell panel 90 is mounted on a shadowed sidewall of the solar paddle. With the panels mounted as shown in the figure, and interconnected, as set forth in the description of FIG. 1, by the conductors 124, 126, 128 and 130 (the conductor 124 being specifically shown in FIG. 2) the unilluminated cells mounted on the unilluminated solar cell panel 90 provide shunting by-pass p-n junction diodes for the corresponding cells of the batteries mounted on the illuminated solar cell panel 72. It will be appreciated that if the solar paddle 132 is rotated 180° while the spacecraft to which it is attached in orbit, the solar cells of the respective panels 72 and 90 will experience a reversal of roles, the cells on the panel 90 becoming illuminated and the cells of the panel 72 becoming shadowed.

By way of reference to FIG. 3, there is shown a spacecraft 136 with a top cover removed to particularly illustrate another embodiment for interconnecting solar cell panels mounted on opposed sides of the spacecraft. The spacecraft 136 may also be fabricated with the solar cell panels 72 and 90, the particular construction of the solar cell panels 72 and 90 being exactly the same as that described in conjunction with FIG. 1 with a conductor 140 secured to the reverse unexposed surface of the solar cell panel 72. An exemplary one of the corresponding conductors 124, 126, 128 and 130 is illustrated as 140 in FIG. 3 and mounted to the reverse unexposed surface of the solar cell panel 90. Instead of the conductors 140 extending through the interior of the spacecraft, as illustrated by 124 in conjunction with the embodiment illustrated in FIG. 2, said conductors are secured to the inner peripheral surfaces 142 of all the solar cell panels mounted on the spacecraft 136. More particularly, the conductor 140 is secured to the spacecraft 136 by clips 150 of any type well known in the prior art, which clips are attached to the inwardly facing unexposed surfaces of the solar cell panels or the spacecraft structure.

Thus, from the foregoing, the invention provides each individual solar cell of a solar cell battery with a shunting solar cell, connected in opposite polarity therewith, which behaves as a diode capable of providing a by-pass current path which is employed when an individual cell of an illuminated battery becomes disabled. Other modifications and embodiments of the present invention are probable and recited in the appended claims wherein:

What is claimed is:

1. In a solar cell battery for generating electrical current including a plurality of series connected solar cells, the improvement comprising a p-n junction solar cell connected in parallel relationship with and in opposite polarity to each of said plurality of series connected solar cells of the battery and so arranged therewith such that when said series connected solar cells are exposed to radiant energy they produce electrical energy and said p-n junction solar cell simultaneously provides a by-pass for the generated current around its corresponding individual parallel connected solar cell when the latter becomes a non-functioning solar cell.

2. A by-pass circuit for electrical current, comprising: a first p-n junction solar cell connected in said circuit with the P-doped material of said first solar cell connected to the N-doped material in its corresponding solar cell and the N-doped material of said first solar cell connected to the P-doped material of said corresponding solar cell, said first solar cell and said corresponding solar cell being so arranged such that when said corresponding solar cell is exposed to radiant energy it produces electrical energy and said first solar cell simultaneously operates as a forward biased diode in said by-pass circuit when said corresponding cell becomes a non-functioning solar cell.

3. A plurality of interconnected solar cell panels, comprising:
   a plurality of terminal boards,
   connecting means for joining a plurality of p-n junction solar cells in series groups to form a plurality of solar batteries,
   mounting means for securing at least one of said solar batteries to each of said terminal boards,
   conductor means for interconnecting each of said series connected solar cells of a solar battery secured to one of said terminal boards with a corresponding solar cell of a solar battery secured to another of said terminal boards to form pairs of corresponding, interconnected solar cells, each of said pairs being in mutual parallel relationship and of mutual reverse polarity, said one of said terminal boards and said another of said terminal boards being so arranged such that when the solar cells secured to said one of said terminal boards are exposed to radiant energy they produce electrical energy and those secured to said another of said terminal boards behave such that each provides a by-pass path for the corresponding cell on said one of said terminal boards to which it is connected when said corresponding cell becomes a non-functioning solar cell.

4. The structure as recited in claim 3, wherein said connecting means includes terminals for connecting said plurality of solar cells in said series groups, and said conductor means includes a plurality of cables respectively connected between the terminals of said pairs of corresponding, interconnected solar cells.

5. The structure as recited in claim 3, wherein said interconnected solar cell panels are erected to form opposed sidewalls of a spacecraft.

6. The structure as recited in claim 4, wherein each of said cables is provided at each of its end with an electrical connection to the terminals of a respective pair of corresponding, interconnected solar cells.

7. The structure as recited in claim 4, and further including:
   clip means for securing the lengths of said cables.

8. The structure as recited in claim 3, wherein said interconnected solar cell panels are erected to form the opposed sidewalls of a solar paddle.

9. In a solar cell array including at least two solar batteries, each comprising a plurality of series connected p-n junction solar cells, the improvement comprising: circuit means connecting each solar cell of one battery in parallel and opposite polarity with a solar cell of the other battery, and means for arranging said batteries such that when one is exposed to radiant energy it provides electrical energy and the other simultaneously behaves such that each of the individual solar cells thereof acts as a forward biased diode and provides a shunt conducting path around the corresponding solar cell of the solar battery exposed to the radiant energy when said corresponding solar cell becomes a non-functioning solar cell.

References Cited

UNITED STATES PATENTS

| | | | |
|---|---|---|---|
| 3,070,699 | 12/1962 | Lehmann et al. | 136—89 UX |
| 3,094,439 | 6/1963 | Mann et al. | 136—89 |
| 3,104,188 | 9/1963 | Moncrieff-Yeates | 136—89 |
| 3,152,774 | 10/1964 | Wyatt | 136—89 UX |
| 3,361,594 | 1/1968 | Iles et al. | 136—89 |
| 3,437,527 | 4/1969 | Webb | 136—89 |
| 3,459,391 | 8/1969 | Haynos | 136—89 X |
| 3,466,198 | 9/1969 | Webb | 136—89 |
| 3,387,199 | 6/1968 | Billerbeck et al. | 320—35 |
| 3,419,779 | 12/1968 | Zehner | 320—40 |

ALLEN B. CURTIS, Primary Examiner

U.S. Cl. X.R.

244—155; 320—40